(No Model.) 4 Sheets—Sheet 2.

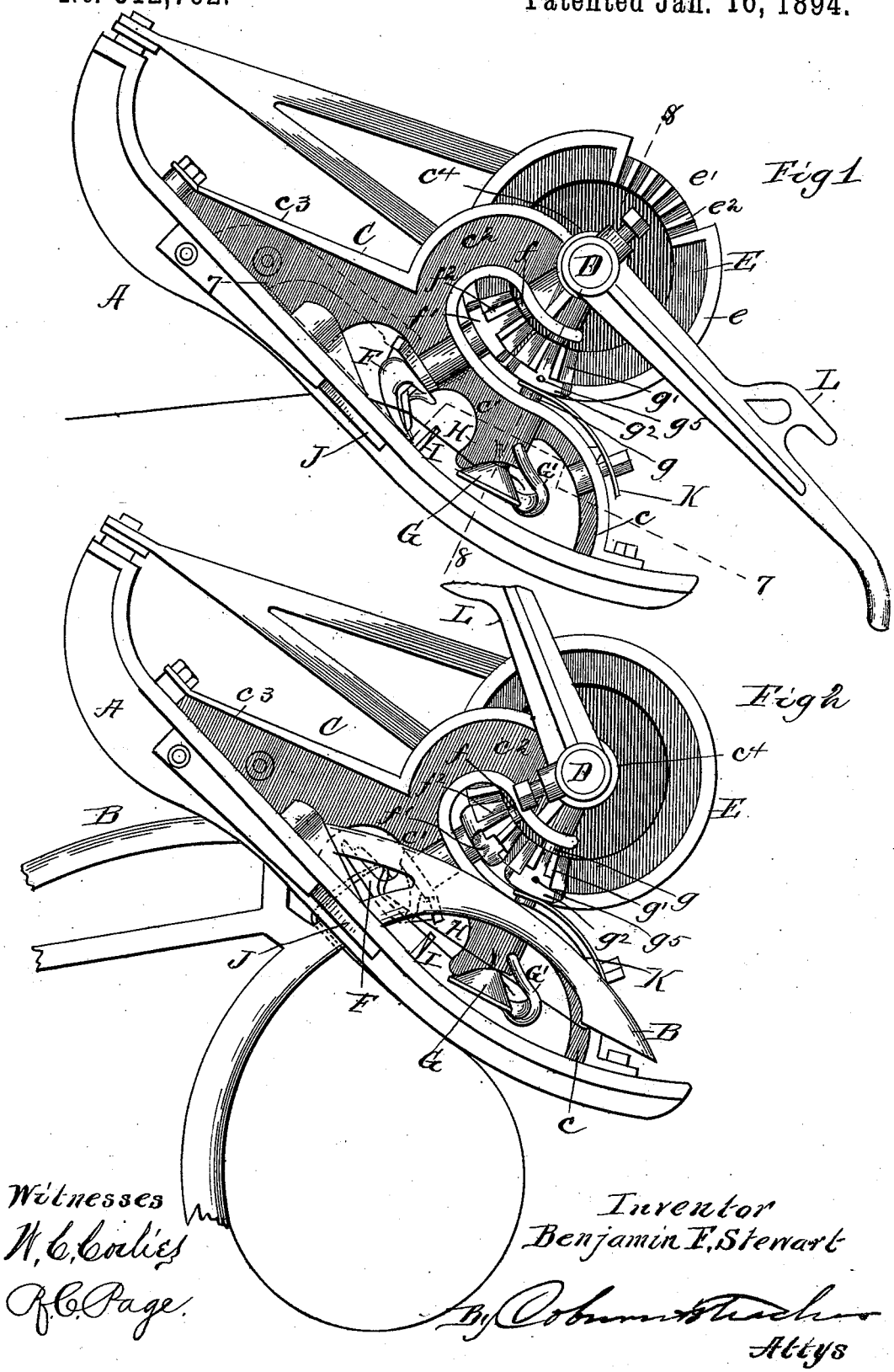

B. F. STEWART.
KNOTTER FOR GRAIN BINDERS.

No. 512,762. Patented Jan. 16, 1894.

Witnesses
W. C. Colies
R. C. Page

Inventor
Benjamin F. Stewart
Attys (No Model.) 4 Sheets—Sheet 3.
B. F. STEWART.
KNOTTER FOR GRAIN BINDERS.

No. 512,762. Patented Jan. 16, 1894.

Witnesses
W. C. Coolies
R. C. Page

Inventor
Benjamin F. Stewart
By Commertacher
Attys (No Model.) 4 Sheets—Sheet 4.
B. F. STEWART.
KNOTTER FOR GRAIN BINDERS.
No. 512,762. Patented Jan. 16, 1894.
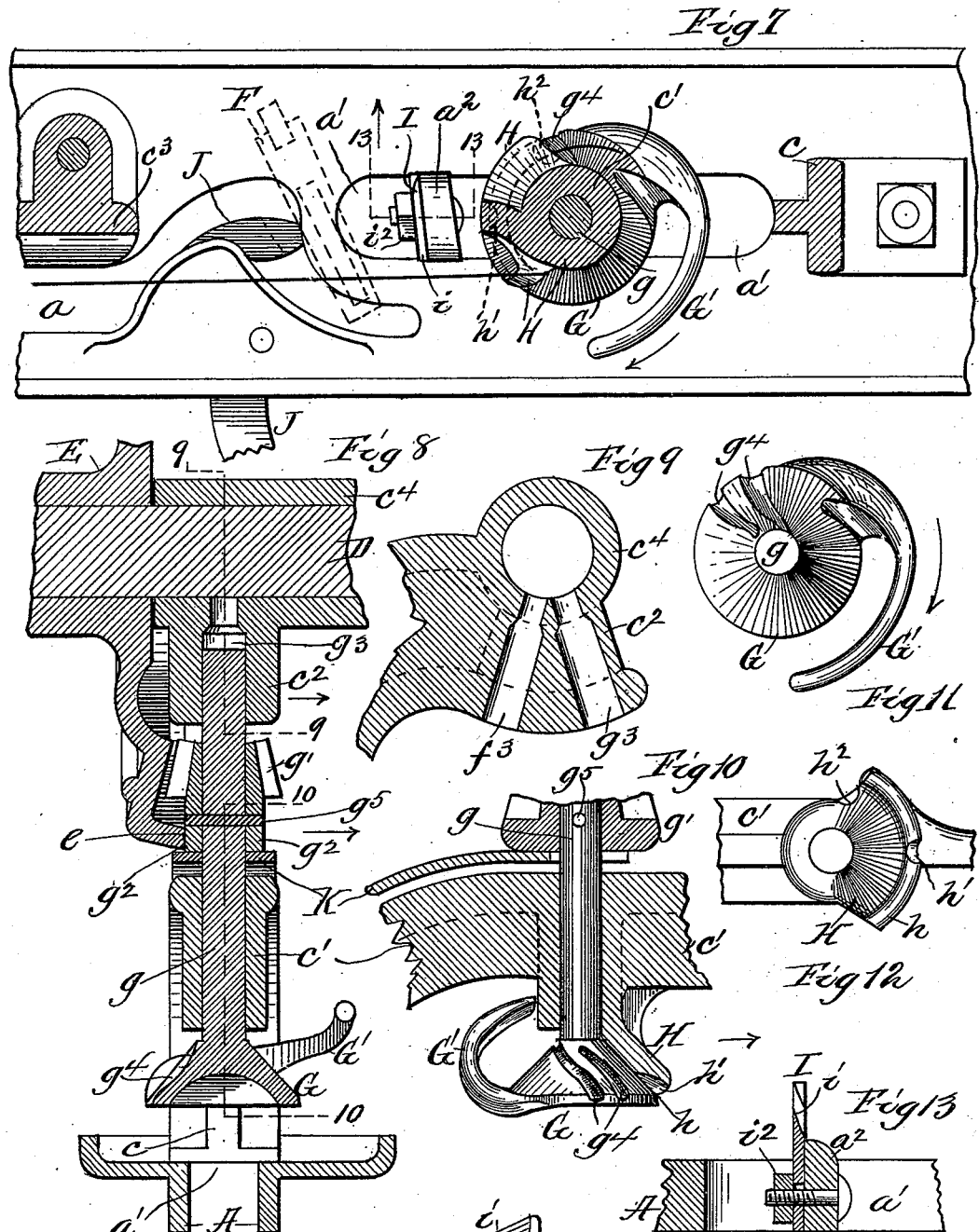
Witnesses
W. C. Cochies
R. C. Page
Inventor
Benjamin F. Stewart
By Robinson & Thacher
Att'ys

UNITED STATES PATENT OFFICE.

BENJAMIN F. STEWART, OF CANTON, OHIO.

KNOTTER FOR GRAIN-BINDERS.

SPECIFICATION forming part of Letters Patent No. 512,762, dated January 16, 1894.

Application filed December 2, 1892. Serial No. 453,829. (No model.)

*To all whom it may concern:*

Be it known that I, BENJAMIN F. STEWART, a citizen of the United States, residing at Canton, in the county of Stark and State of Ohio, have invented certain new and useful Improvements in Knotters for Grain-Binders, which are fully set forth in the following specification, reference being had to the accompanying drawings, in which—

Figure 3:
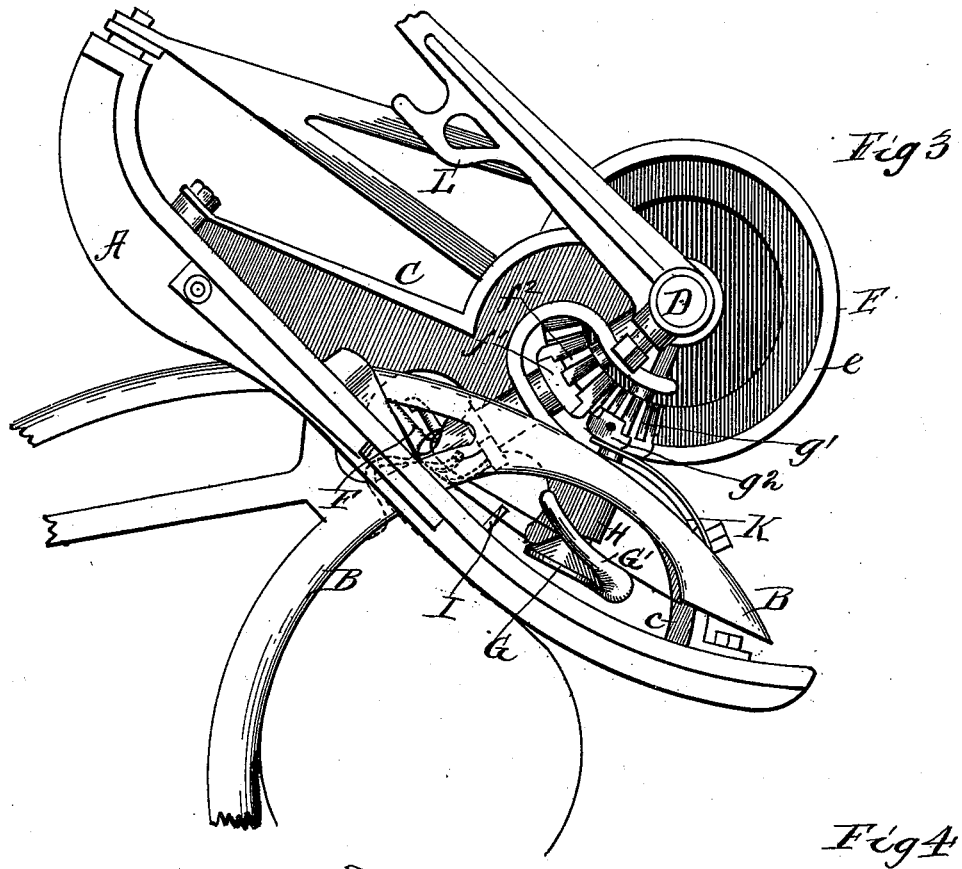
Figure 4:
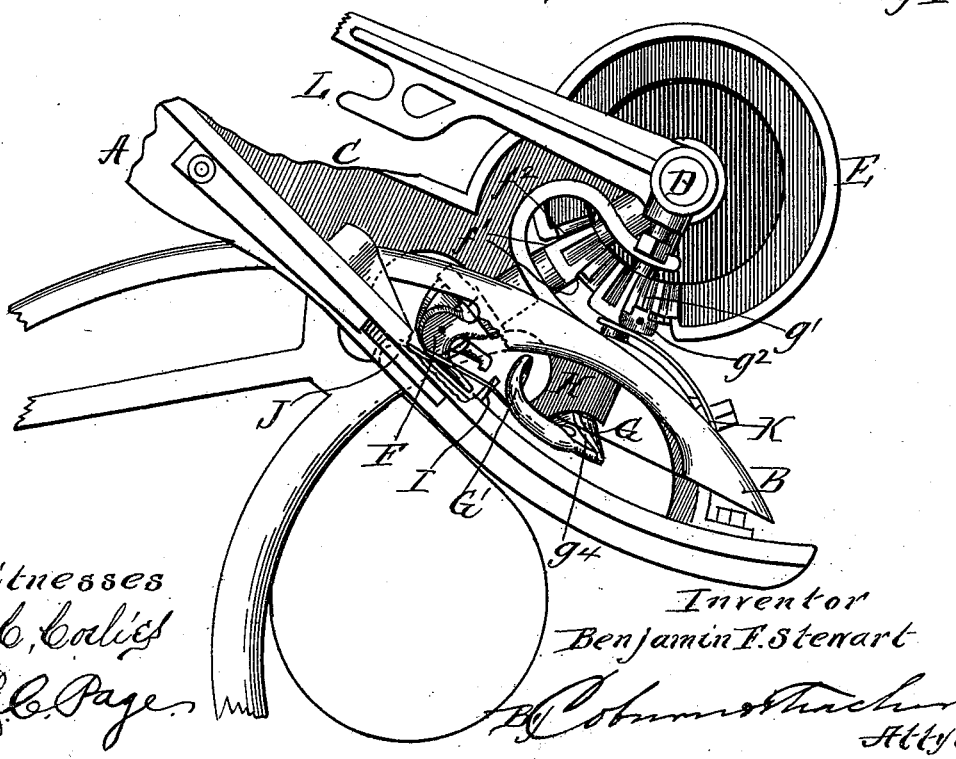
Figure 5:
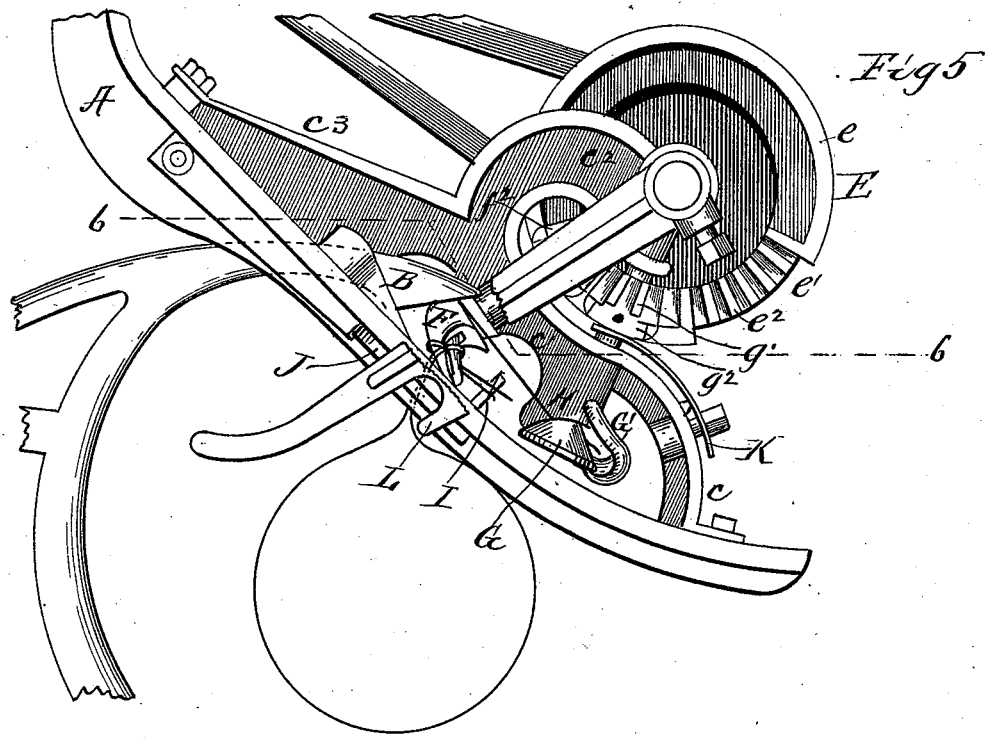
Figure 6:
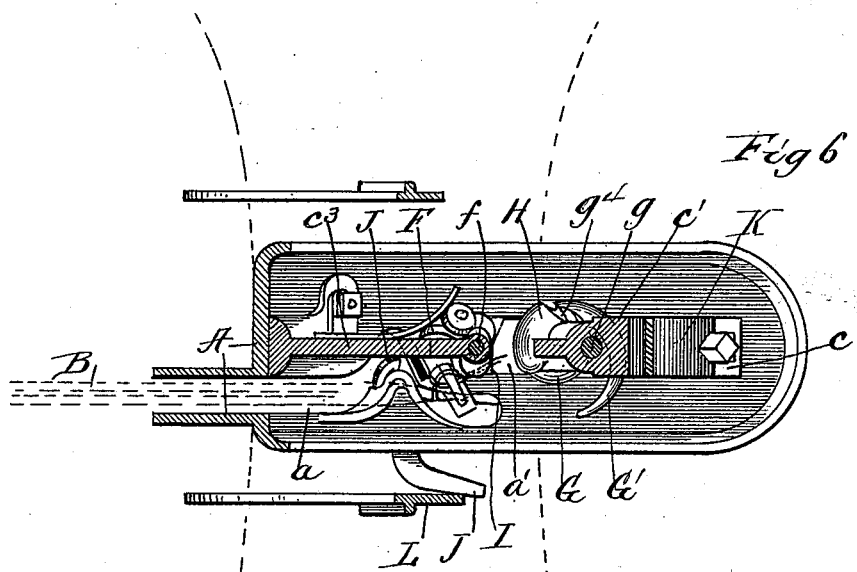

Figure 1 represents a side elevation of the breast-plate of a binder and knotter frame mounted thereon, embodying my invention in normal position of rest; Fig. 2, a similar view of the same at the first movement for binding just after the needle-arm has closed around the bundle and the knotter has made a quarter turn; Fig. 3, a similar view of the same parts when the knotter has made a half revolution; Fig. 4, a similar view of the same when the knotter has made three-quarters of a revolution; Fig. 5, a similar view of the same when the knotter has completed its revolution and the cord has been severed; Fig. 6, a plan section of the same taken on the broken line 6—6 of Fig. 5; Fig. 7, a plan section taken on the broken line 7—7 of Fig. 1; Fig. 8, a detail section taken on the line 8—8 of Fig. 1; Fig. 9, a detail vertical section taken on the line 9—9 of Fig. 8; Fig. 10, a similar section taken on the line 10—10, Fig. 8; Fig. 11, a plan of the cord-holder disk detached; Fig. 12, a bottom plan of the cord-holder hood; Fig. 13, a detail vertical section taken on the line 13—13, Fig. 7, and Fig. 14, a front elevation of the knife shown in Fig. 13.

In the drawings Figs. 1 to 6 inclusive are upon one scale, and Figs. 7 to 14 inclusive are upon another and enlarged scale.

My invention relates to devices for holding, knotting and severing the cord in that class of binders in which twine is used as the binding material; and consists in certain improvements in these devices.

I will first describe the construction and operation of so much of a grain binding mechanism, as is necessary to an understanding of my invention, and will then point out definitely in claims the improvements which I believe to be new and wish to secure by Letters Patent.

In the drawings A represents the breast-plate of a binder, B the binding-arm, or needle-arm, and C the knotter frame, which is mounted on the breast-plate, the latter in this instance being shown over the grain-table and the needle-arm arranged below the same, so as to swing upward to place the cord around the bundle and over the knotter preparatory to tying the knot. The binding-shaft D, mounted in any usual way, passes through a tubular bearing at the upper end of the knotter frame C and the segmental gear wheel E is fastened to this shaft, as usual.

The knotter frame C is of somewhat peculiar form; the main portion is substantially S-shaped, something like that shown in my prior patent, No. 464,531, dated December 8, 1891; but its attachment to the breast-plate is different. In this instance the foot $c$ of the S portion is secured to the breast-plate at its lower or foot end and outside of the cord-holder and knotting-hook; thence it is carried upward and backward in a kind of S curve, this middle section $c'$ being of greater length proportionately than the two ends of the S, thus providing a kind of long arm extending backward over the breast-plate, as seen in Fig. 1; and from the rear portion of this long central section there rises the upper member $c^2$ of the S, curving upward and forward again, as shown in said Fig. 1. A tail-piece, or arm $c^3$, either in one piece with or secured to the S portion of the frame, extends backward from about the inner portion of the middle section $c'$ and is brought down to the upper portion of the breast-plate where it is firmly secured to the latter; it will be seen that this construction provides a strong firm support for the knotter frame, both at front and rear, and also leaves a long open space between these two supports extending underneath the long middle section $c'$ and between it and the breast-plate. A tubular bearing $c^4$, for the binding-shaft, is at the extremity of the upper section $c^2$ of the S portion of this frame.

The knotting-hook F is of the ordinary bill-hook type and is mounted in the middle section $c'$ of the knotter frame by means of its shaft $f$, which passes through and has a bearing in said section near the rear extremity of the same just before it begins to bend more sharply upward, as seen in the four first figures of the drawings. The bearing of this shaft in the knotter frame is inclined slightly rearward and it passes down through the latter, so that the shaft mounted therein stands in a similar direction slightly inclined from a perpendicular to the breast-plate, as seen in the said four figures; and above the section $c'$ the shaft has a small beveled pinion $f^2$ provided with a delay surface $f'$ at one side thereof, and formed by cutting away the inner portion of the pinion at this point. The moving member G of the cord-holder is also mounted in this same long middle section $c'$ of the knotter frame just in front of the knotting-hook and between it and the lower end, or foot, $c$ of the S-part of the frame. This member G of the cord-holder is revoluble and its mounting in the frame is effected by passing its shaft $g$ through the frame section $c'$ thereby giving it a bearing therein. On this cord-holder shaft above $c'$ there is a beveled pinion $g'$ similar to the knotting-hook pinion, provided with a similar delay surface $g^2$ at one side thereof, and secured to the shaft by a pin $g^5$.

The segmental gear wheel E is provided on its inner face, next to the knotting-hook, with a flange $e$ running around the wheel, except a short portion thereof, where the entire outer edge of the wheel is cut away to form an open space $e'$, a little deeper than the width of the rim, as seen in Figs. 1 and 5. Just within this open space $e'$ the wheel is provided with a gear section, or segment, $e^2$ on the inner face thereof and extending along the entire length of the said opening, containing a sufficient number of teeth to give the pinions one full turn each, as also seen in Figs. 1 and 5. The several parts are so arranged that the face of the flange $e$ acts as a delay surface upon the respective delay surfaces upon the pinions of the knotting-hook and cord-holder heretofore mentioned, thus serving to secure the latter in a fixed position, so long as these surfaces remain in contact; while the gear section $e^2$ is adapted to engage with both said pinions to give them their required rotation, as will be hereinafter described. It is obvious that for this operation the shafts of the knotting-hook and cord-holder must stand substantially radial to the segmental gear wheel, which will result, of course, in the said shafts standing at an angle to each other, as seen in Figs. 1 and 2 of the drawings and also in Fig. 9, in which the bearings $f^3$ and $g^3$, for the upper ends of the shafts of the knotting-hook and cord-holder respectively, are shown in the upper section $c^2$ of the frame. Under the arrangement seen in the drawings, the cord-holder shaft is about perpendicular to the breast-plate, while the knotting-hook shaft is slightly inclined therefrom, as heretofore explained.

Obviously, the moving member G of the cord-holder is revoluble by means of the shaft to which it is attached. This member is a cone-shaped disk arranged with its convex surface uppermost and provided with shallow notches, or grooves, $g^4$ at one part of its surface, as seen in Fig. 11, in which two such grooves are shown running from the inner to the outer edge of the disk and bending forward somewhat in their course, the revolution of the disk being in the direction of the arrow in said figure. The fixed member of the cord-holder consists of a quadrant shaped hood H projected downward from the frame section $c'$ in one piece with which it is formed, or is rigidly secured thereto, as may be desired. This hood is arranged so as to extend downward over the revolving disk at the upper, or inner, side of the shaft thereof, as seen in Fig. 5, and substantially conforms to the surface of the said disk. The outer edge of the hood H is flattened slightly on the under side to provide a narrow rim $h$, as seen in Fig. 12, and in this narrow rim there is cut a shallow notch $h'$ looking toward the knotting-hook and about in line therewith. A similar notch $h^2$ is provided in the rear edge of the hood just back of the flat surface $h$, as seen in the bottom plan, Fig. 12, of this hood. The disk G is also provided with a long arm $G'$, which springs from the outer edge thereof, a little in front of the notches $g^4$, as seen in Fig. 11, and thence extends around the disk in a curve at the same time bending upward, as seen in Figs. 8, 10 and 11. This arm stands out from the disk, so as to leave quite a wide opening between the two, as is also seen in said figures.

The breast-plate is provided with the usual slot $a$ to accommodate the movement of the binding arm, this slot being sinuous at its lower portion which, however, is a known construction. The breast-plate is also provided with an additional slot $a'$ in the lower part thereof commencing about under the bearing of the knotter-hook shaft and extending down nearly to the foot of the knotter frame. A bridge $a^2$ crosses this latter slot near the upper end thereof, as seen in Fig. 7. A knife, or cutter, I for severing the cord is mounted on this bridge; this cutter is a thin blade adapted to set down in the slot $a'$ crosswise thereof and at its upper end having a cutting edge $i$, which is inclined from the commencement of the cutting point, upward to the opposite edge, as seen in Fig. 14; this blade is also provided with an oblong aperture $i'$ by means of which it is secured adjustably to the bridge by a bolt and nut $i^2$, as seen in Fig. 13. The bridge is set slightly inclined across the slot, as seen in Fig. 7 and, of course, the cutter-blade will have the same position, and the two are arranged so that the knotting-hook and curved arm on the cord-holder disk will just freely clear the blade in the course of their revolution, one on one side thereof and the other on the opposite side.

The shaft of the cord-holder disk has a slight longitudinal movement in its bearing and a spring K is fastened at one end to the knotter frame while the other free end is brought to rest underneath the pinion on the upper part of said shaft, upon which it acts to hold the shaft and pinion up to cause the twine to be properly clamped between the disk and its hood, while at the same time the force is yielding to adapt the cord-holder for proper action upon twine of different sizes and inequalities that may occur therein.

As shown in the drawings there is a pivoted gate J secured to the under side of the breast-plate, for the purpose of closing the slot a below the knotting-hook, and an arm L on the binding shaft adapted to open this gate at the proper moment; these devices, however, are no part of my present invention and are described and claimed in my prior application for Letters Patent, Serial No. 416,199, filed December 26, 1891.

It will be seen from the above description that both the knotting-hook shaft and the cord-holder shaft are mounted in the same central section of the S frame by reason of the prolongation of the latter; and that, by arranging the said shafts at an angle to each other, they may be made radial to the single segmental gear wheel and, therefore, may be driven by the same gear segment on the latter, as well as held in position of rest by the same delay surface. The construction and arrangement of these parts are such that there is ample room for bringing the pinions of these two shafts close together, but with ample room for the rotation of each without interference with the other. It will be noticed also that both the knotting-hook and cord-holder are arranged inside, the foot of the knotter frame by which it is attached to the lower end of the breast-plate. This S-shaped portion of the knotter frame may be made of sufficient strength to dispense with any other support from the breast-plate, except the foot just mentioned; but I prefer the construction already described in which there is also a rear, or upper, support connected to the upper portion of the breast-plate. In this arrangement there is a long free space between the two supports and underneath the center section of the S, which permits the arrangement of the knotting-hook and cord-holder described above.

The operation is as follows: In the normal state of rest, while the gavel is being formed on the binder, the parts are in the position relatively, as seen in Fig. 1 of the drawings. As soon as the bundle is formed and the binding mechanism is set in operation by a trip, or any other means, the first movement of the binding shaft closes the needle-arm and brings the cord up and over the bundle, as seen in Fig. 2 of the drawings. The continued rotation of the shaft brings the gear segment on the segmental gear wheel into engagement with the pinion of the knotter-shaft; obviously, this engagement will take place before engagement with the pinion on the cord-holder shaft, so that before such latter engagement, the knotter-hook will have performed a part revolution. This prior movement of the knotter-hook is about one-fourth of a revolution, during which the hook takes the two strands of the band and commences the formation of the loop, and the parts just at this point will be in the relative position seen in Fig. 2 of the drawings, just previous to the movement of the cord-holder and the segmental gear wheel having made nearly a half revolution. The continued movement of the binding shaft will now rotate both the knotting-hook and cord-holder by means of the one gear segment, which is now in engagement with the pinions on both shafts; and when the wheel E has made about a half revolution the knotting-hook will have made nearly a half turn and the cord-holder not quite a quarter turn, the devices appearing in about the relative positions seen in Fig. 3 of the drawings. The movement continuing, the knotting-hook and cord-holder will continue to rotate and, when the knotting-hook has completed about a three-quarter revolution, the cord-holder will have made about a half revolution and the devices will appear as seen in Fig. 4, in which the jaws of the knotting-hook have been opened and the curved arm on the holder has moved forward over the cord, thereby directing it into the open jaws, as seen in the said figure. The rotation of the binding shaft continuing, the one revolution of the knotting-hook is completed, thus completing the knot on the jaws, and the simultaneous turning of the cord-holder carries the curved arm thereon farther along over the cord, which by the shape of the arm already described, forces the cord down upon the knife and the two strands are severed. The knotting-hook has come to a stop just before the severing of the cord, but the gear segment has not yet left the cord-holder pinion and so the latter will be carried around alone for the remainder of its revolution, until it is brought into normal position again, as seen in Fig. 1. The arm on the cord-holder disk being curved, as already described, not only severs the two strands of cord, as stated, but also forces the strand, running from the binding arm, underneath the hood, so that it will be caught between the latter and the revolving disk just before the cord is cut. The continued rotation of the cord-holding disk, after the cord has been severed, will sweep this severed end of the strand, running from the binding arm, around until it reaches the notch in the back edge of the hood, as shown in Fig. 5, and thence this strand of the cord lies over the front portion of the disk extending out from under the hood at the opposite edge thereof, and when the binding arm opens, or makes its reverse movement, this strand of cord will be carried up along this side of the hood, as seen in Figs. 1 and 5. As soon as the rotation of the knotting-hook begins, however, the additional strain brought upon this strand of the cord will pull it around the curved edge of the hood underneath the front thereof and into the notch $h'$, so that this extended end of the cord will then lie diagonally across the disk from the front notch $h'$ to the back notch $h^2$, and is of such length that it will project out beyond the disk some little distance at the back notch, as seen in Fig. 1. In forming the knot this portion of the cord is sufficient to make the loop and for this purpose it is drawn through between the disk and the hood, under the usual strain produced by the knotting-hook in forming the loop, as described; the shaft of the disk having a yielding longitudinal motion, permits this drawing of the cord along between the disk and the hood. From the description above it will be noticed that the knife upon which the cord is cut stands at two angles with reference to the breast-plate; it is inclined both horizontally and vertically, and hence a drawing cut in two directions is obtained, which makes the severing of the cord easy under the compression of the curved arm on the holder disk. It will be understood, of course, that as the gear segment leaves the pinions respectively, the delay surfaces come into operation and the pinions are stopped and held in a fixed position until another revolution of the wheel brings the gear segment around into position for another engagement. The opening in the wheel immediately outside of the gear segment, of course, allows the free rotation of the pinions during the passage of this portion of the wheel by the pinions. The movement of the binding shaft, after the gear segment is freed from the pinion of the cord-holder, as seen in Fig. 5, to its final position of rest, as seen in Fig. 1, completes the reverse movement of the binding arm and discharges the bundle by the action of the discharge arm L.

The construction and operation of the cord-holder, described above, I consider an important improvement, for by continuing the rotation of the disk until one full turn is made, enough cord is taken up by the cord-holder to feed the knotting-hook in the operation of tying the knot and this extended end of the cord is reversed by the turning of the disk, so that it extends backward from the position in which it was cut by the knife; at the same time it will lie, practically, in a straight line in the holder from one notch to the other thereof, and, therefore, can be drawn through the holder readily, because there are no sharp angles, or curves. This operation enables me to dispense with any swinging motion of the cord-holder bodily. The two grooves in the face of the cord-holder disk are for the purpose of carrying off and discharging from under the hood any pieces of cord that may happen to remain in the cord-holder, after the cord is severed. The relative arrangement of the segmental gear wheel, and the shafts of the knotting-hook and cord-holder, is also a desirable improvement, for as already stated, it permits the driving of these two devices by a single gear segment on the wheel, thereby simplifying and cheapening the construction. It further provides for the ready lubrication of the knotter and cord-holder shafts, for as seen in Fig. 9, the two upper bearing openings for these shafts extend through the upper section of the knotter frame and, at their upper ends open into the bearing of the binding shaft, so that the two former bearings may be lubricated from the latter, some of the lubricating material, applied to the binding shaft bearing, escaping into the two smaller bearings for this purpose. The pinions on the knotting shaft and cord-holder shaft may be provided with delay surfaces on opposite sides, for convenience in changing position, if desired. The curved arm on the cord-holder disk may be used upon a revolving disk of different shape, and so far as merely clamping and holding the cord are concerned, of different operation, if desired; and other changes may be made in details of construction, as compared with those described above and shown in the drawings.

Having thus described my invention, what I claim as new, and desire to secure by Letters Patent, is—

1. In a grain binder, a slotted breast-plate, in combination with a knotter frame, substantially of S form, having its foot secured to the lower end of the breast plate outside the slot therein, and its central section extending backward therefrom over the breast plate, and a knotter hook and revoluble cord holder mounted in said frame and both arranged inside of the foot thereof, substantially as described.

2. In a grain-binder, a breast-plate, in combination with a knotter frame, mainly of S form, having its foot secured to the lower end of the breast-plate and provided with an elongated central section extending backward therefrom, and a tail-piece, or arm, rigid with the S frame and extending backward to the upper portion of the breast-plate to which it is secured, substantially as described.

3. In a grain-binder, a knotter frame, in combination with a knotting-hook and revoluble cord-holder, the shafts of which are both mounted in said frame, and a cam and gear wheel on the binding shaft provided with a single gear segment adapted to engage with pinions on both the knotter shaft and the cord-holder shaft, whereby the two latter are both rotated by a single gear segment, substantially as described.

4. In a grain binder, a breast-plate, in combination with a knotter frame mounted thereon, a revoluble knotting-hook and a revoluble cord-holder disk, the shafts of which are both mounted in said frame in the same vertical plane and with the knotting-hook arranged in front of the cord-holder, a gear wheel provided with a single gear segment adapted to engage with pinions on said respective shafts and to engage first with the knotting-hook pinion, whereby the latter is given a partial rotation before the gear segment engages with and begins to rotate the cord-holder pinion, substantially as described.

5. In a grain-binder, a knotter frame, in combination with a knotting-hook and cord-holder the shafts of which are both mounted in said frame, pinions attached to the said shafts respectively and provided with delay surfaces, and a gear wheel provided with a single gear segment and a single delay surface, whereby both the knotting-hook and cord-holder are rotated one full revolution each by a single gear segment and held in a state of rest by a single delay surface, both on a single wheel, substantially as described.

6. In a grain-binder, a breast-plate, in combination with a knotter frame, S-shaped and mounted by its foot at the lower, or front, end of the breast-plate and having its middle section extending over the latter, and a tail-piece, or arm, rigid with the S frame extending back therefrom to the breast-plate and secured thereto, whereby a long free space is provided between the S frame and breast-plate and extending from the front to the rear support of the former, and a revoluble knotting-hook arranged in said free space and having its shaft mounted in said S frame, substantially as described.

7. In a grain-binder, a breast-plate, in combination with a knotter frame, S shaped and mounted by its foot at the lower, or front, end of the breast-plate and having its middle section extending over the latter, and a tail-piece, or arm, rigid with the S frame extending back therefrom to the breast-plate and secured thereto, whereby a long free space is provided between the S frame and breast-plate and extending from the front to the rear support of the former, and a cord-holder arranged in said space between the breast-plate and knotter frame and having a revoluble member, the shaft of which is mounted in said S frame, substantially as described.

8. In a grain-binder, a breast-plate, in combination with a knotter frame, S-shaped and mounted by its foot at the lower, or front, end of the breast-plate and having its middle section extending over the latter, and a tail-piece, or arm, rigid with the S frame extending back therefrom to the breast-plate and secured thereto, whereby a long free space is provided between the S frame and breast-plate and extending from the front to the rear support of the former, and a knotting-hook and cord-holder, both arranged in said free space between the breast-plate and knotter frame and between the front and rear supports of the latter, substantially as described.

9. In a grain-binder, a cord-holder consisting of a revoluble cone-shaped disk, in combination with a stationary segmental hood reaching over said disk and conforming thereto, and a movable guide adapted to sweep the cord in between the two members of the cord-holder, substantially as described.

10. In a grain-binder, a cord-holder consisting of a revoluble cone-shaped disk, in combination with a fixed segmental hood extending over the same and adapted to clamp the cord between the two, constructed and arranged to reverse the end of the cord by the rotation of the disk and to take up sufficient cord in the said extended end to supply the quantity required in tying the knot by drawing the said extended end through the cord-holder, substantially as described.

11. In a grain-binder, a revoluble knotting-hook, in combination with a cord-holder composed of a revoluble disk and stationary hood over the same, a knife arranged between the knotting-hook and cordholder, and an arm fixed on said disk and curving forward and upward therefrom, whereby the said arm, carried along by the disk, will pass over the strands of cord, press them inward and downward against the knife, and at the same time sweep the main strand in between the disk and its hood, substantially as described.

12. In a grain-binder, a revoluble knotting-hook, in combination with the conical revoluble cord-holder disk G, and stationary hood H extending over the said disk and provided with notches $h'—h^2$ to stop and guide the cord, substantially as described.

13. In a grain-binder, a revoluble knotting-hook, in combination with a revoluble cord-holder disk G, a stationary hood H extending over said disk, a knife I standing across the breast-plate between the knotter and cord-holder, and an arm G' rigid with said disk and curving forward and upward from its point of junction therewith, substantially as described.

14. In a grain-binder, a revoluble knotting-hook, in combination with a cord-holder, and a cord cutter I arranged across the breast-plate at a slight angle thereto and having its cutting edge inclined upward from front to rear, substantially as described.

15. In a grain-binder, a knotter frame provided with a bearing $c^4$, for the binding shaft, in combination with the knotting-hook shaft f and cord-holder disk shaft g, both mounted in the knotter frame and having bearings for their upper ends opening into said bearing $c^4$, substantially as described.

16. In a grain-binder, the breast-plate A provided with a short slot $a'$ at its lower end and a bridge $a^2$ across the same, in combination with a cutter I adapted to set in said slot and detachably fastened to the bridge, a knotting-hook and a cord-holder, substantially as described.

17. In a grain binder, a cord-holder consisting of a revoluble conical disk, in combination with a stationary hood arranged above and extending over the convex surface of said disk, and devices for rotating the latter, substantially as described.

18. In a grain-binder, a revoluble conical cord-holding disk, in combination with a stationary hood fitted to and extending over the convex surface of said disk, and an arm, or finger, rigid with said disk and projecting forward and upward therefrom in the direction of its movement, substantially as described.

BENJAMIN F. STEWART.

Witnesses:
R. C. PAGE,
MINNIE E. SMITH.